(12) United States Patent
Ekchian

(10) Patent No.: US 8,800,155 B2
(45) Date of Patent: Aug. 12, 2014

(54) DISPLACEMENT SENSOR WITH REDUCED HYSTERESIS

(76) Inventor: Jack A. Ekchian, Belmont, MA (US)

( * ) Notice: Subject to any disclaimer, the term of this patent is extended or adjusted under 35 U.S.C. 154(b) by 150 days.

(21) Appl. No.: 13/453,849

(22) Filed: Apr. 23, 2012

(65) Prior Publication Data

US 2012/0266470 A1 Oct. 25, 2012

Related U.S. Application Data

(60) Provisional application No. 61/517,597, filed on Apr. 22, 2011.

(51) Int. Cl.
G01C 9/06 (2006.01)
(52) U.S. Cl.
USPC ........................................................ 33/366.15
(58) Field of Classification Search
USPC .............. 33/366.15, 366.18, 366.19, 366.21, 33/366.22
See application file for complete search history.

(56) References Cited

U.S. PATENT DOCUMENTS

| | | | |
|---|---|---|---|
| 3,442,023 A * | 5/1969 | Remington et al. ....... | 33/366.22 |
| 3,906,471 A | 9/1975 | Shawhan | |
| 3,931,428 A | 1/1976 | Reick | |
| 3,973,510 A | 8/1976 | McCulloch et al. | |
| 4,167,818 A * | 9/1979 | Cantarella et al. ......... | 33/366.14 |
| 4,624,140 A | 11/1986 | Ekchian et al. | |
| 4,912,662 A | 3/1990 | Butler et al. | |
| 4,937,518 A * | 6/1990 | Donati et al. .............. | 33/366.19 |
| 5,083,383 A | 1/1992 | Heger | |
| 5,107,540 A | 4/1992 | Mooney et al. | |
| 5,170,567 A * | 12/1992 | Davis et al. ................ | 33/366.13 |
| 5,172,481 A * | 12/1992 | Wiseman et al. .......... | 33/366.12 |
| 5,476,056 A | 12/1995 | Tokunaga et al. | |
| 5,682,132 A | 10/1997 | Hiroyoshi et al. | |
| 5,708,726 A | 1/1998 | Brinkley et al. | |
| 5,780,958 A | 7/1998 | Strugach et al. | |
| 6,282,804 B1 * | 9/2001 | Jiang .......................... | 33/366.21 |
| 6,323,758 B1 | 11/2001 | Morita | |
| 6,777,895 B2 | 8/2004 | Shimoda et al. | |
| 7,156,032 B2 | 1/2007 | Kornblit et al. | |
| 7,188,426 B2 * | 3/2007 | Barr .......................... | 33/366.19 |
| 7,258,731 B2 | 8/2007 | D'Urso et al. | |
| 7,485,343 B1 | 2/2009 | Branson et al. | |
| 7,497,118 B2 * | 3/2009 | Ploechinger ............... | 33/366.15 |
| 8,510,966 B2 * | 8/2013 | Ekchian ..................... | 33/366.13 |
| 8,549,764 B2 * | 10/2013 | Muyskens et al. ......... | 33/366.19 |
| 2007/0259156 A1 | 11/2007 | Kempers et al. | |
| 2008/0206550 A1 | 8/2008 | Borlner | |
| 2008/0248216 A1 | 10/2008 | Yeung et al. | |
| 2008/0268233 A1 | 10/2008 | Lawin et al. | |
| 2008/0286556 A1 | 11/2008 | D'urso et al. | |
| 2010/0028599 A1 | 2/2010 | Steiner et al. | |
| 2010/0068434 A1 | 3/2010 | Steele et al. | |
| 2010/0081750 A1 | 4/2010 | Guire et al. | |
| 2010/0098909 A1 | 4/2010 | Reyssat et al. | |
| 2010/0112286 A1 | 5/2010 | Bahadur et al. | |
| 2010/0203287 A1 | 8/2010 | Jiang et al. | |
| 2010/0316842 A1 | 12/2010 | Tuteja et al. | |
| 2010/0330340 A1 | 12/2010 | Rothstein et al. | |
| 2011/0239476 A1 | 10/2011 | Ekchian | |

\* cited by examiner

*Primary Examiner* — G. Bradley Bennett

(57) ABSTRACT

A method and apparatus are provided for reducing hysteresis in displacement sensors by reducing the resistance to motion between components in the sensing units that move relative to each other.

19 Claims, 9 Drawing Sheets

DISPLACEMENT SENSOR WITH REDUCED HYSTERESIS

CROSS-REFERENCE TO RELATED APPLICATIONS

This application claims priority of U.S. Provisional Patent Application No. 61/517,597 filed Apr. 22, 2011, entitled "Improved Displacement Sensor with Reduced Hysteresis", the contents of which are hereby incorporated herein by reference in their entirety.

FIELD OF INVENTION

The present invention generally relates to displacement sensors such as, for example, inclinometers, accelerometers and position transducers. More particularly, the invention relates to the reduction or elimination of hysteresis in such sensors.

BACKGROUND

A myriad of displacement sensors are used in industrial, commercial and residential applications. These include, for example, inclinometers and accelerometers. The accuracy and effectiveness of such sensors are generally limited by their inherent hysteresis.

Displacement sensors generally comprise a base for attaching the sensor to other objects and an enclosure that is attached to the base and contains a sensing unit. The base may be of any convenient shape or in any convenient orientation. The sensing unit typically comprises two kinds of elements. One kind of element in the sensing unit is typically fixed relative to the base, while another is configured such that it can move relative to the fixed elements. The relative motion between the fixed and moving elements in the sensing unit, which is typically a function of the displacement of the base, is measured and used to determine the displacement of the sensor base.

In one class of displacement sensors, the sensing unit comprises a liquid element contained in a vessel. When the sensor is displaced, the liquid element moves relative to the vessel. The position of the liquid with respect to one or more vessel wall segments is detected and used to determine displacement, inclination or acceleration of the sensor base. U.S. Pat. No. 4,624,140, the contents of which are hereby incorporated herein by reference in their entirety, describes an inclinometer with a sensing unit comprising a vessel that is partially filled with a conductive liquid. The sensing unit further comprises conductive wall segments that are held in a fixed position relative to the inclinometer base and at least one of which is coated with a thin dielectric coating. In use, when the inclination of the base of such an inclinometer is varied, the conductive liquid covers a variable portion of at least one dielectric coated wall segment. The capacitance between the conductive liquid and the at least one dielectric coated wall segment, which varies as a function of the inclination of the base of the device, is used as a measure of displacement of the sensor. The liquid element may be any conductive flowable material that conforms to the shape of the vessel in which it is placed during use. It may contain multiple liquids, solids and other dissolved or undissolved materials.

An alternate capacitive sensor, which uses a low conductivity liquid as the dielectric of a variable capacitor, is disclosed in U.S. Pat. No. 3,906,471, the contents of which are incorporated herein by reference in their entirety. U.S. Pat. Nos. 4,912,662 and 5,083,383, the contents of which are incorporated herein by reference in their entirety, also describe other configurations of inclinometers using a liquid element in the sensing unit.

Generally, the accuracy of inclinometers and other displacement sensor technologies, with and without liquid sensing elements, are limited by hysteresis. Hysteresis in such sensors is at least partially caused by stickiness or adhesion between the elements of the sensing unit that are fixed with respect to the base of the sensor and those elements that are intended to move relative to the base when the base is displaced. In liquid filled sensors, stickiness or adhesion between the liquid element and solid surfaces that it contacts causes or contributes to the hysteresis of the sensor.

SUMMARY OF INVENTION

It is an object of the invention to reduce or eliminate the hysteresis of displacement sensors by vibrating the sensing unit.

It is another object of the invention to reduce the hysteresis of liquid filled displacement sensors by decreasing the amount of stickiness or adhesion between the liquid and at least a portion of a surface contacted by the liquid.

It is yet another object of the invention to reduce the hysteresis of liquid filled displacement sensors by reducing wetting by the liquid of at least a portion of a surface contacted within the vessel in which it is contained. The surface contacted by the liquid may be a part of the vessel wall or a surface otherwise enclosed within the vessel. It is preferred that the static contact angle that the liquid forms with a portion of the surface contacted by it be greater than 80°. It is more preferred that the static contact angle the liquid forms with at least a portion of the surface it contacts is greater than 90°. It is yet more preferred that the static contact angle formed between the liquid and the surface is greater than 150° and still more preferred that the static contact angle formed between the liquid and the surface is greater than 170°.

It is a further object of this invention to configure the liquid medium, in a liquid filled sensor, and at least a portion of the surface contacted by it such that, upon relative motion between them, the difference between the leading and trailing contact angles is less than 10°. It is preferred that the difference between the leading and trailing contact angles is less than 5° and more preferred that it is less than 1.0°.

It is a still further object of this invention to reduce hysteresis of liquid filled displacement sensors by reducing the sticking or adhesion between the sensing liquid and at least a portion of the wall of the vessel where the liquid is contained by forming a gas barrier between the liquid and that portion of the surface.

In an embodiment configured according to the invention, an intervening vibration mechanism is placed between the sensing unit of a displacement sensor and the base or the housing of the sensor. The vibration mechanism may be activated whenever the sensing unit detects a displacement. The mechanism may be activated for the duration of the displacement or other predetermined period. Alternatively, the vibration mechanism may be activated for a preset period preceding the reading of the sensor output. The effect of the operation of the vibration mechanism on sensor output may also be quantified during the calibration process of the sensor when other spurious effects on sensor output are eliminated, minimized or rendered insignificant. This effect of the vibration mechanism may be correlated to, for example, the vibration mechanism input or other sensor operating parameter so that sensor output may be corrected for the effect of the vibration mechanism.

U.S. Pat. Nos. 5,107,540; 5,682,132; 5,708,726; 5,780,958; 6,323,758; and 6,777,895, the contents of each of which are hereby incorporated herein by reference in their entirety, describe vibration actuators used in conjunction with portable electronic devices. U.S. patent application 2011/0239476, the contents of which are hereby incorporated herein by reference in their entirety, describe apparatus and methods to reduce hysteresis in displacement sensors.

In another embodiment configured according to the invention, a vessel with a liquid element comprising water is used in the sensing unit of an inclinometer. The relative position between the liquid element and the vessel is determined and used as a measure of the inclination of the sensor base. Certain materials including, for example, solids and other liquids, may be incorporated in the liquid element in the sensing unit to affect properties such as, for example, the electrical conductivity, viscosity, and surface tension of the liquid element. In order to reduce the adhesion or sticking between the liquid element and at least a portion of a surface that is contacted by it, the liquid element and/or the surface may be configured to increase the contact angle to a value greater than 100°, preferably greater than 120°, more preferably greater than 150°, and yet more preferably greater than 170°. If the liquid comprises water, this effect may be achieved by, for example, coating the surface with a hydrophobic or super-hydrophobic material or by physically or chemically modifying the micro or nano structure of the surface.

The effect of such coatings may be amplified by incorporating certain micro or nano scale surface structures so as to increase surface roughness. U.S. patent applications 2007/0259156, 2008/0206550, 2008/0248216, 2008/0268233, 2008/0286556, 2010/0028599, 2010/0068434, 2010/0081750, 2010/0098909, 2010/0112286, 2010/0203287, 2010/0316842, and 2010/0330340, the contents of each of which are hereby incorporated herein by reference in their entirety, describe various coatings and surface structures which may be used to reduce the adhesion between a liquid and a surface with which a liquid is in contact. U.S. Pat. Nos. 3,931,428; 3,973,510; 5,476,056; 7,156,032; 7,258,731; and 7,485,343, the contents of each of which are hereby incorporated herein by reference in their entirety, also describe various coatings and surface enhancements which may be used to reduce adhesion or stickiness between a liquid and a surface which the liquid comes into contact with.

In a further embodiment configured according to the invention, a capacitive liquid filled sensing element is used to measure the displacement imparted to a sensor. A variable capacitance is established between a conductive liquid element and at least one dielectric coated wall segment. The sensing unit may be configured such that the capacitance between the liquid and at least one dielectric coated wall segment is measured. Alternatively, the sensing unit is configured such that a variable capacitance is established between two or more dielectric coated wall segments, two or more of which are at least partially covered by a conductive liquid at any given time.

It is preferred that, if the liquid comprises water, substantially the entire inner surface of the vessel that contacts the liquid be made hydrophobic or super-hydrophobic. This may be achieved by coating the surface or by physically or chemically altering it. Some surfaces in the vessel that need to be used to make direct electrical contact with the liquid may be left uncoated, coated with a material that is conductive or with a material that is porous and can be penetrated by the liquid. Such surfaces may alternatively be coated with a hydrophilic material.

The terms conductive, insulating, and dielectric are not intended to indicate a particular or absolute degree of conductivity but rather a degree of relative conductivity. Since all materials conduct electric charge to at least a limited degree, the terms conductive, insulating, and dielectric are used to indicate the relative ability of materials to conduct electric charge. In a capacitor, it is preferred that the level of conductivity of the plates be significantly greater than the conductivity of the dielectric material between the plates. Therefore, a material that may be used as a dielectric material in a certain capacitor may have sufficient conductivity to act as the plates of a capacitor in another application.

DETAILED DESCRIPTION OF INVENTION

Certain exemplary embodiments will now be described to provide an overall understanding of the principles of the structure, function, manufacture and use of the system and methods disclosed herein for reducing the hysteresis of sensors or sensor components. One or more examples of these embodiments are illustrated in the accompanying drawings and described herein. Those of ordinary skill in the art will understand that the systems, methods and examples described herein and illustrated in the accompanying drawings are non-limiting exemplary embodiments and that the scope of the present invention is defined solely by the claims. The features illustrated or described in connection with one exemplary embodiment may be combined with features of other embodiments and that the features may be used individually, singularly and/or in various combinations. Such modifications are intended to be included within the scope of the present invention.

Figure 1:
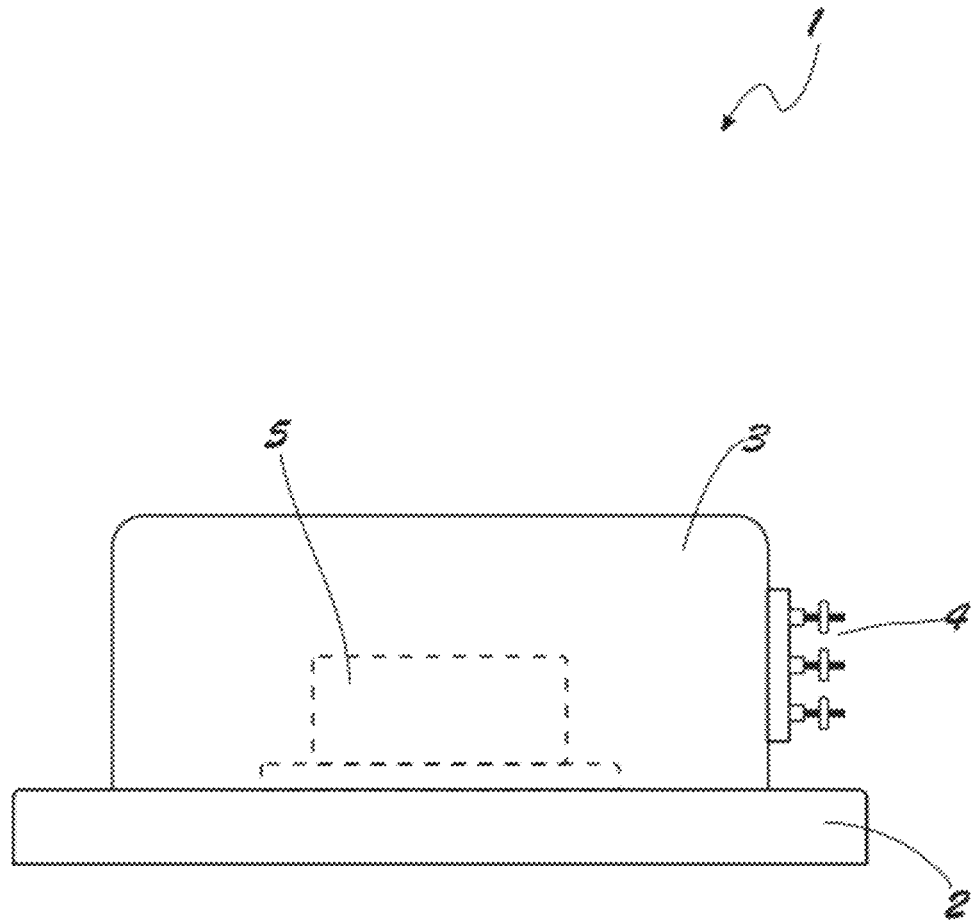
FIG. 1 is a schematic of a conventional displacement sensor comprising a sensing unit.

FIG. 1 shows a schematic of a conventional displacement sensor 1 with base 2, enclosure 3, and terminal strip 4 for supplying power, ground and output signal connections. The sensor comprises a sensing unit 5. When base 2 is displaced, the sensing unit produces an output signal that is proportional to the displacement.

Figure 2:
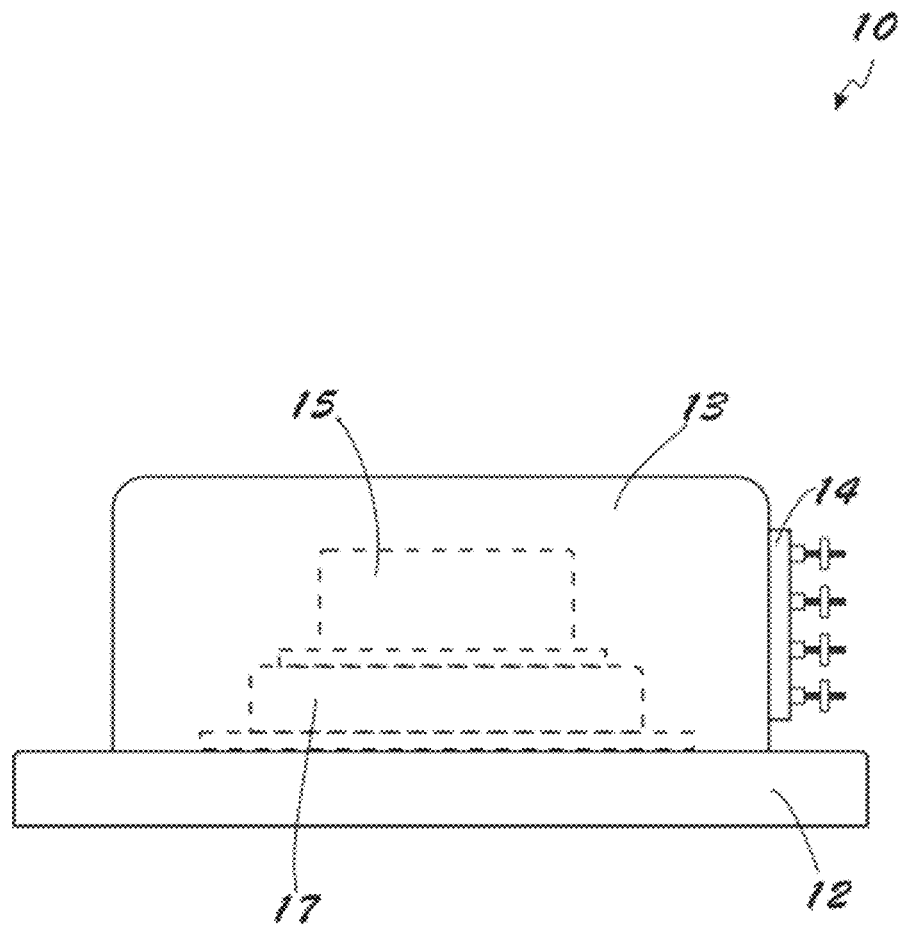
FIG. 2 is a schematic of an embodiment of the invention comprising a sensing unit and a vibration mechanism.

FIG. 2 shows a schematic of a displacement sensor 10 with base 12 and housing 13 and sensing unit 15. An intervening vibration mechanism 17 is configured to impart vibrations to the sensing unit 15.

Figure 3:
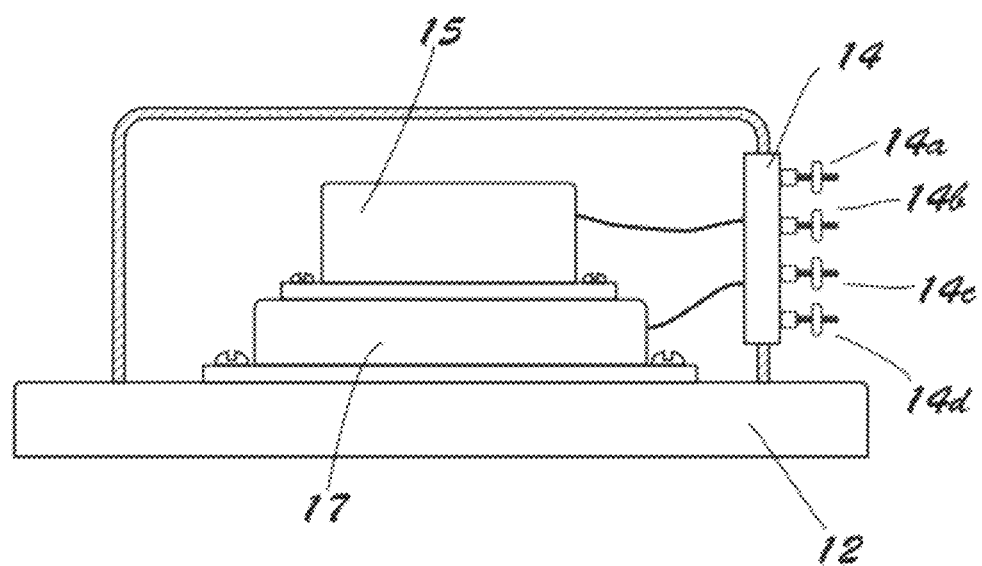
FIG. 3 is a schematic of a partially sectioned view of the embodiment of FIG. 2.

FIG. 3 shows a sectioned schematic of the embodiment in FIG. 2. The vibration mechanism 17 may be configured to vibrate the sensing unit 15 to reduce any sticking between two or more elements of the sensing unit 15 that are configured to move relative to each other. The timing, frequency, amplitude, and direction of the vibrations may be controlled by a controller that may be incorporated in the sensor housing (not shown). Terminal strip 14 may comprise terminals for input power 14a, ground 14b, sensor output signal 14c, and control input signal 14d which may be used to activate the vibration mechanism externally.

Figure 4A:
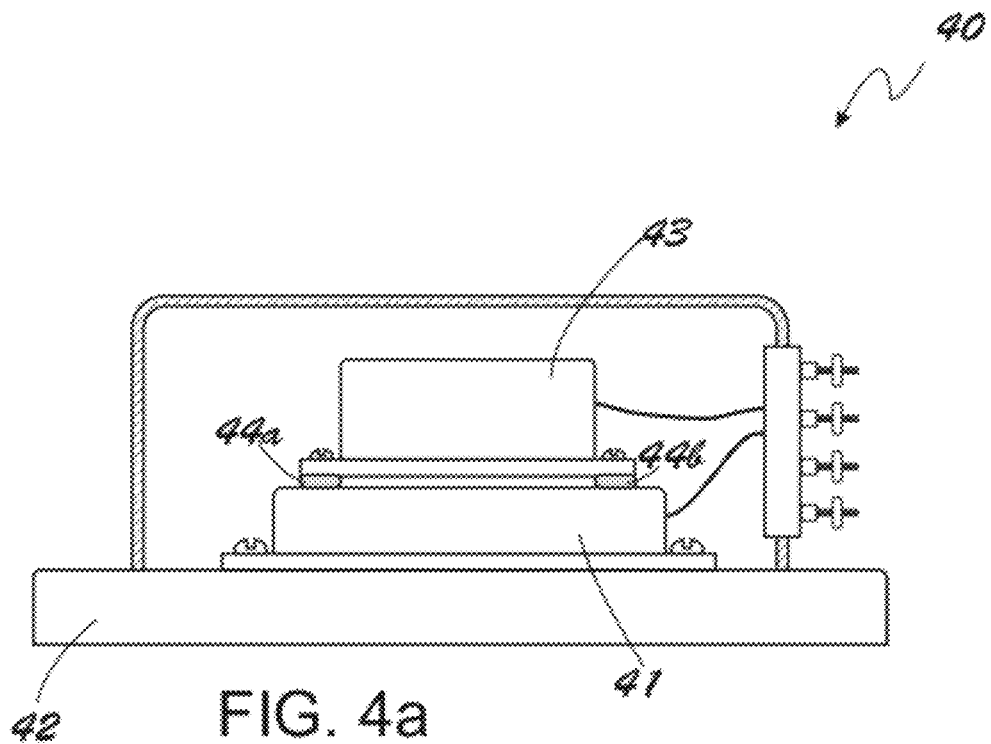
FIG. 4a is a schematic showing a partially section view of another embodiment of the invention comprising a sensing unit and vibration mechanism.

FIG. 4a shows a schematic of another embodiment configured according to the invention. The displacement sensor 40 comprises a vibration mechanism 41 attached to base 42. The sensing unit 43 is attached to vibration mechanism 41 with intervening flexible spacers 44a and 44b.

Figure 4B:
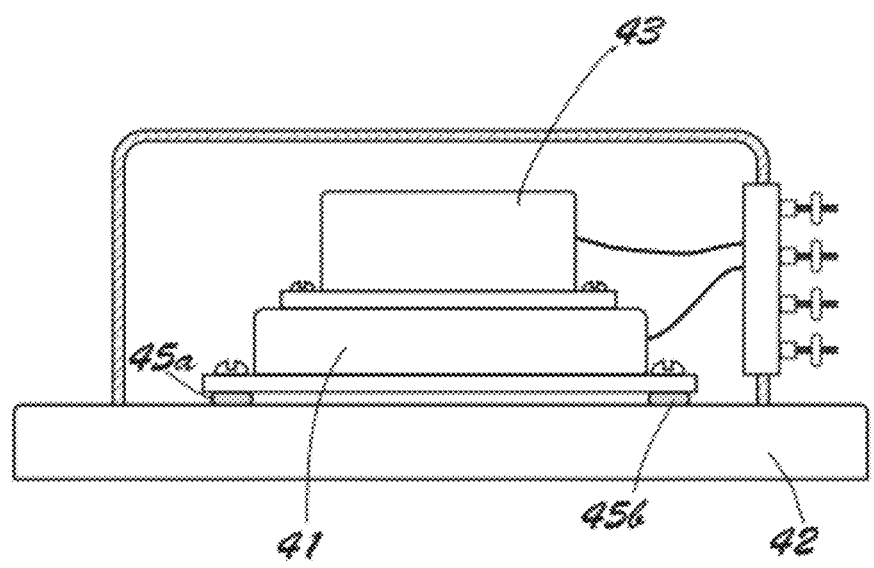
FIG. 4b is a schematic showing a partially sectioned view of yet another embodiment of the invention comprising a sensing unit and vibration mechanism.

FIG. 4b shows a schematic of yet another embodiment configured according to the invention comprising a vibration mechanism 41 that is attached to sensing unit 43. The vibration mechanism 41 is attached to the base 42 with intervening flexible spacers 45a and 45b.

Figure 5B:
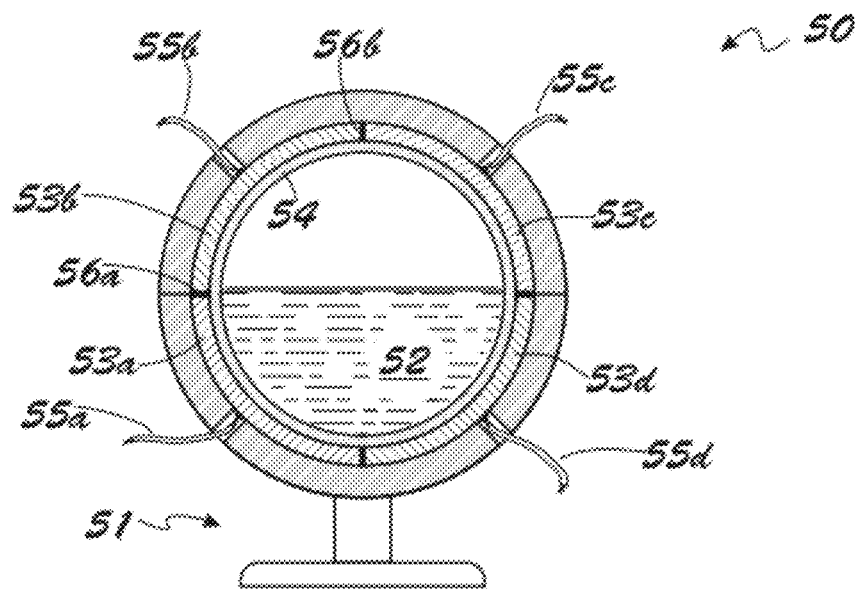
FIG. 5 is a schematic of a sectioned view of a conventional liquid filled sensing unit and base.
Figure 5B:
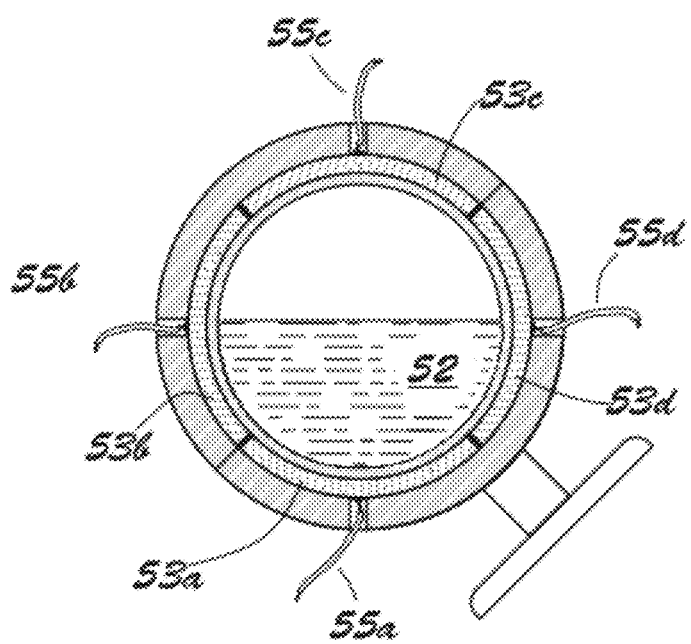

FIG. 5a shows a schematic of a liquid filled sensor configured according to the invention disclosed in U.S. Pat. No. 4,624,140. A spherical vessel 50, which is attached to base 51, comprises a conductive liquid-like medium 52. Element 52 may be a material that flows that comprises a mixture or solution of liquids or liquids and solids. A conductive liquid like medium may be, for example, a liquid, mixture of liquids, a mixture of one or more liquids and one or more solids or any other material that flows. The spherical vessel is divided into four conductive wall segments 53a, 53b, 53c, and 53d which are mutually insulated quarter spheres. The conductive wall segments are covered by a thin dielectric layer 54. Wall segments 53a, 53b, 53c, and 53d are connected to terminal conductors 55a, 55b, 55c, and 55d respectively. Insulating material 56a and 56b electrically insulates the quarter spherical wall segments. FIG. 5b shows the sensor in FIG. 5a after it has undergone a 45° counterclockwise displacement. In this position, the changes in capacitance between 55a and 55b and between 55a and 55d are a function of the change in inclination of the base.

Alternatively, the sensor in FIG. 5a may be configured such that only certain conductive wall segments, such as for example 53a and 53d are coated with a dielectric layer while for example 53b and 53c are left bare. With this configuration, the capacitance between the liquid and wall segments 53a or 53d may be determined by measuring the capacitance between, for example, lead 55b and lead 55d or between lead 55b and 55a depending on the position of the sensor.

Figure 6A:
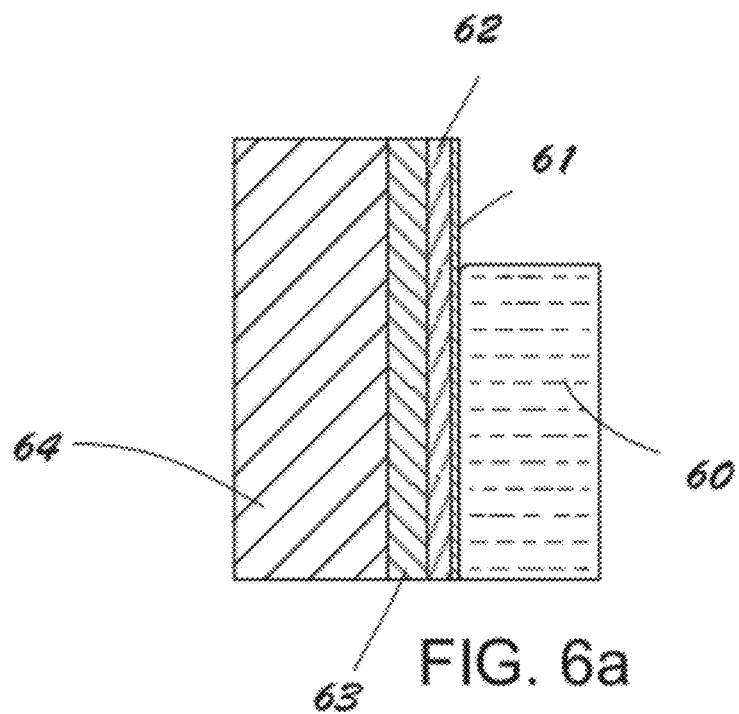
FIG. 6 is a schematic showing cross sections of wall segments of a vessel of a liquid filled sensor configured according to an aspect of the invention.

The schematic in FIG. 6a shows a cross section of the wall of a liquid filled capacitive sensor configured according to an embodiment of the invention. Liquid element 60, which may be a liquid or other liquid-like medium that flows, contacts a surface 61 which is configured to reduce the sticking or adhesion between it and liquid element 60. Coating 62 is a dielectric coating or film. Conductive wall segment 63 is supported by a structural wall which is preferably made of an insulating material. The capacitance between wall segment 63 and liquid element 60 is a function of the area of the portion of wall segment 63 that is covered by the liquid element 60, the thicknesses of the layers 61 and 62, and the dielectric constants of layers 61 and 62. It is preferred that the conductivity of at least one of layers 61 and 62 be significantly less than the conductivity of wall segment 63 and liquid element 60. The material and/or surface structure of layer 61 is selected to reduce or eliminate adhesion of the liquid element 60 to the exposed surface of layer 61. The nano or micro level structure of the surface of layer 61 may be determined by the composition of the layer, the surface structure of layer 62 or the surface structure of the conductive wall segment 63. The existence of a gas barrier between liquid element 60 and layer 61 is also dependent on the surface composition and structure of the surface roughness. It is preferred that the liquid element 60 is water which may contain solutes to increase its conductivity, or alter its conductivity or viscosity, and that the exposed surface of layer 61 is a hydrophobic or super-hydrophobic surface.

Figure 6B:
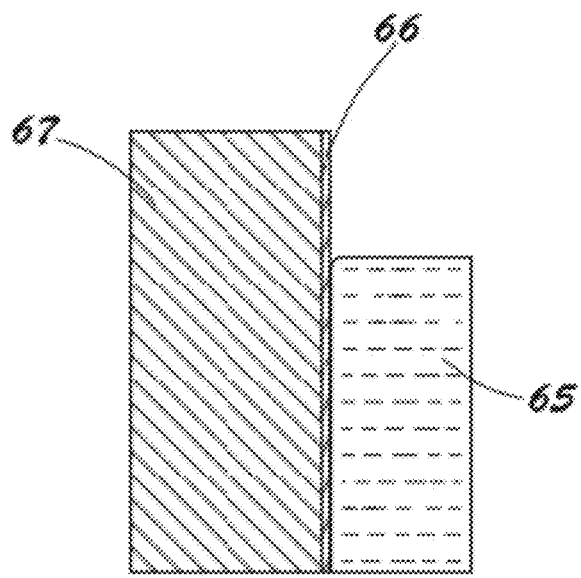

The schematic in FIG. 6b shows the cross section of the wall of a liquid filled capacitive sensor configured according to an aspect of an embodiment of the invention. Conductive liquid element 65, preferably water, covers a variable portion of conductive wall segment 67 that is coated with a thin layer 66 which acts as the dielectric to form a variable capacitor. The surface of layer 66 facing the liquid is preferably configured to be a hydrophobic or super-hydrophobic surface by selecting the composition of the layer 66 and/or its micro or nano surface structure. It is preferred that the static contact angle between liquid element 60 and layer 61 or liquid element 65 and layer 66 be at least 80°. It is more preferred that the contact angle be at least 90°, yet more preferred that the contact angle be at least 150° and still more preferred that the contact angle be at least 170°. When there is relative motion between liquid element 60 and layer 61 or liquid element 65 and layer 66, it is preferred that the difference between the leading and trailing contact angles be less than 10°. It is more preferred that this difference between leading and trailing contact angles be less than 5° and yet more preferred that the difference be less than 1°.

Figure 7A:
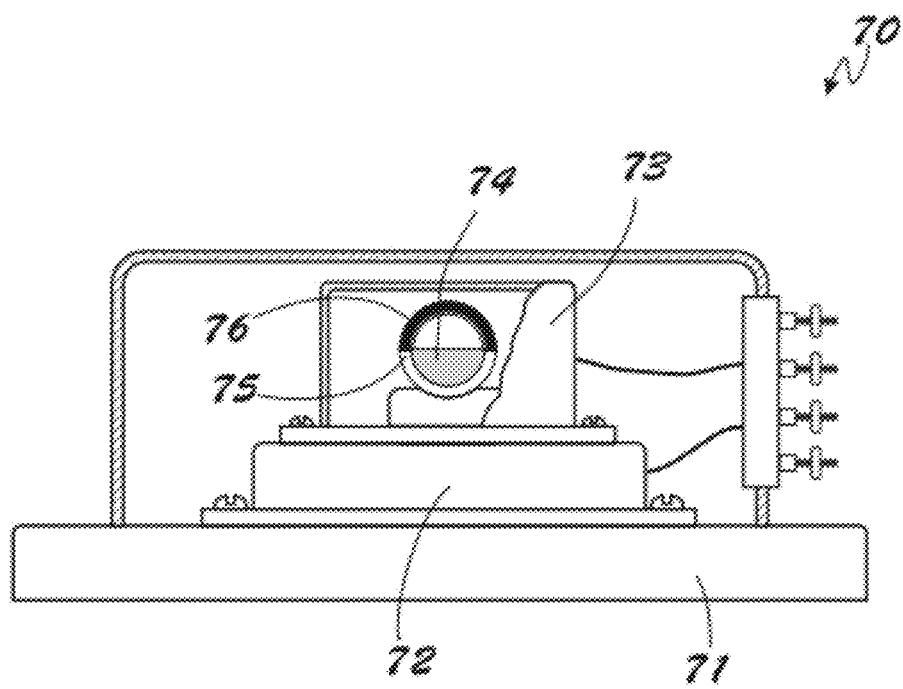
FIG. 7 is a schematic showing a partially sectioned view of a displacement sensor with a sensing unit comprising a liquid filled vessel.

The schematic in FIG. 7a shows an inclinometer 70 configured according to an embodiment of the invention comprising a base 71, a vibration mechanism 72 and a sensing unit 73. The sensing unit comprises a liquid filled vessel with conductive liquid 74, conducting wall segment 75 and dielectric coated conductive wall segment 76. The shape of the vessel may be any convenient shape, although a spherical or a cylindrical vessel is preferred. In this embodiment, the conductive liquid is in electrical contact with at least a portion of the inner surface of wall segment 75. It is preferred that as much of the inner surface of the vessel as possible be made hydrophobic or super-hydrophobic to minimize the sticking or adhesion between the inner surface of the vessel and the liquid. The surface may be made hydrophobic or superhydrophobic by, for example, using hydrophobic materials or by using micro or nano surface structures that impact these properties. However, in order to permit electrical contact between the liquid and wall segment 75, a sufficient portion of the inner surface of wall segment 75 is left uncoated, coated with a conductive material, or a material that can be penetrated by the conductive liquid. Alternatively the surface of wall segment 75 may be coated with or made of a hydrophilic material where a layer of the conductive liquid will adhere to at least a portion of the conductive surface of the conductive wall segment.

Figure 7B:
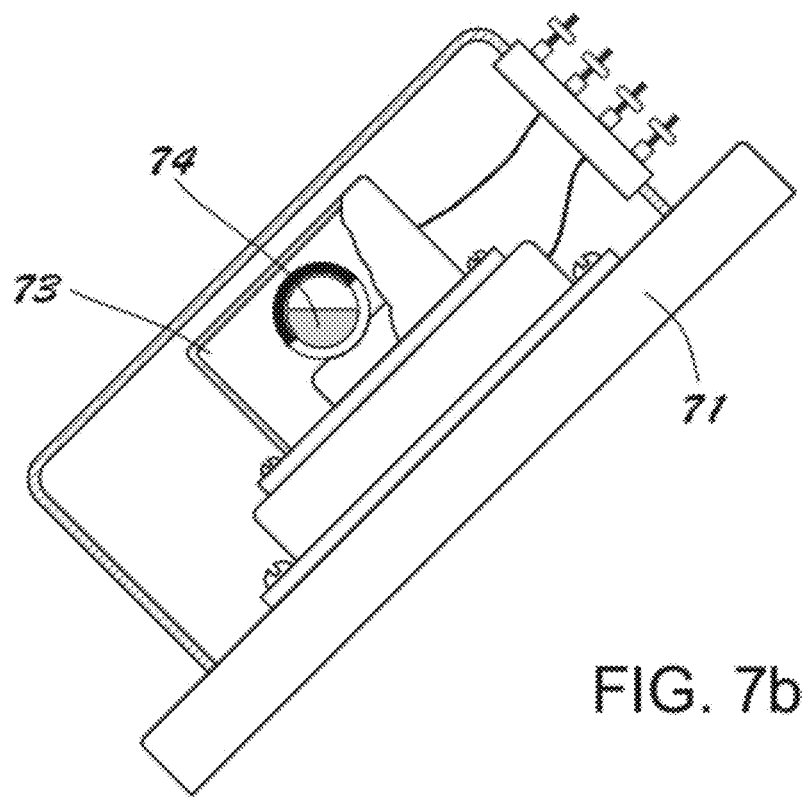

FIG. 7b shows a schematic of the embodiment in FIG. 7a after it has undergone a 45° change in inclination. It is preferred that liquid 74 remain stationary or undergo only translation. It is, preferred that the adhesion or sticking between the liquid 74 and all or at least some of the inner surfaces of the vessel be reduced or eliminated. This may be achieved by using materials and/or surface structures that produce a contact angle preferably greater than 80°, more preferably greater than 120°, still more preferably greater than 150°, and yet more preferably greater than 170° between the liquid and at least a portion of the surface that the liquid comes in contact with.

Figure 8A:
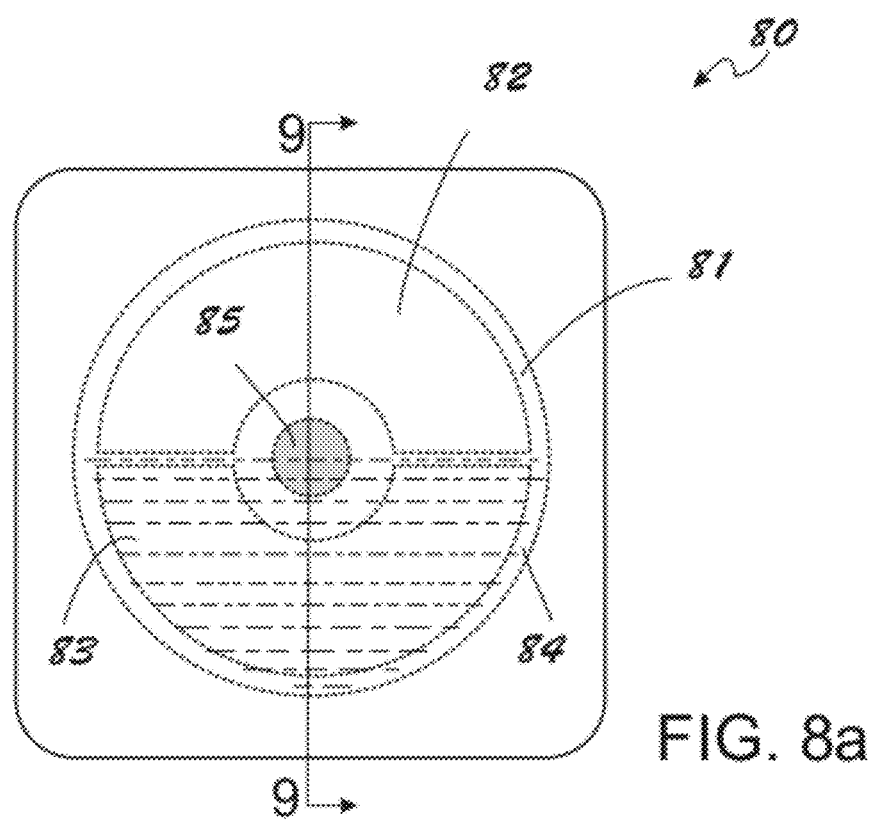
FIG. 8 is a schematic showing a partially sectioned view of a sensing unit configured according to an aspect of an embodiment of the invention.

FIG. 8a shows a schematic of a liquid filled sensing unit 80 of a displacement sensor configured according to the invention. The sensing unit 80 comprises a cylindrical vessel 81 with coated wall segments 82 and 83. Wall segment 83 is completely covered by conductive liquid 84. Conductive wall segment 85 is configured to be in electrical contact with the conductive liquid 84 when the sensing unit 80 is in use. The surface area of wall segment 85 is sufficiently large to conduct the amount of current necessary to charge up the capacitor formed between the conductive liquid 84 and the dielectric coated wall segments, such as 82 and 83. However, wall segment 85 is located centrally and sized so that the relative motion between the liquid and uncoated wall segments may be minimized. Wall segment 85 may also be coated with any conductive coating that is hydrophobic or hydrophilic or may be otherwise configured to produce an increased contact angle.

Figure 8B:
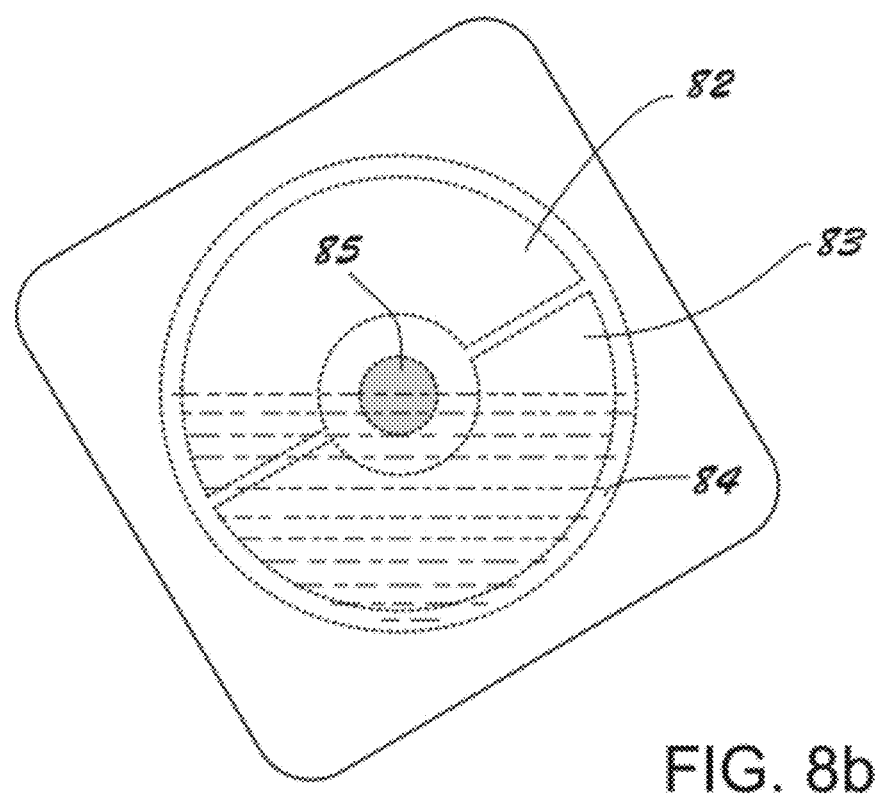

FIG. 8b is a schematic showing the sensing unit in FIG. 8a after it has undergone a change in inclination of 45°. As a result of the displacement, liquid 84 covers less of the dielectric coated conductive wall segment 83 and more of dielectric coated conductive wall segment 82. Conductive wall segment 85 remains in electrical contact with liquid 84.

As a result of the change in inclination, the capacitance between conductive liquid 84 and wall segment 83 has decreased and the capacitance between conductive liquid 84 and wall segment 82 has increased. It is preferred that the liquid element 84 be comprised largely of water and that substantially all of the internal surfaces within the cylindrical vessel 81 be hydrophobic or super-hydrophobic.

Figure 9:
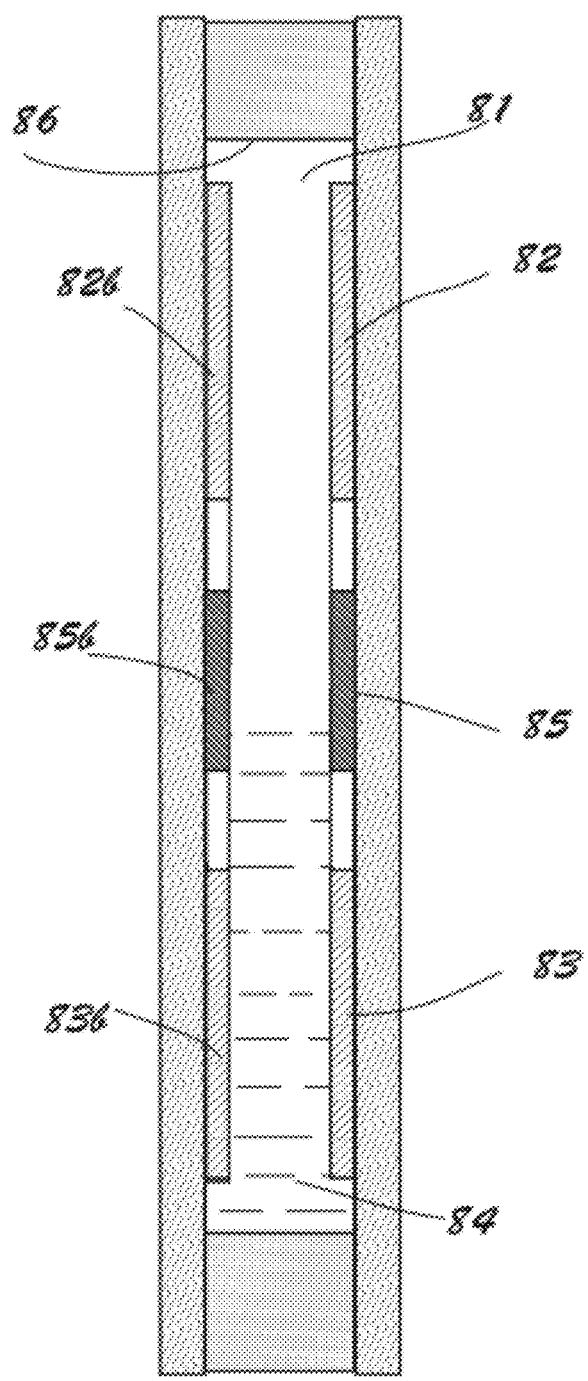
FIG. 9 is a schematic showing another side view of a cross section of the embodiment in FIG. 8.

FIG. 9 shows a sectioned side view of the sensing unit in FIG. 8a. Cylindrical vessel 81 is partially filled with conductive liquid 84. Various portions of dielectric coated conductive wall segments 82, 82b, 83 and 83b are covered by conductive liquid 84 depending on the position of the vessel. Preferably all surfaces within the cylindrical vessel 81, such as the wall segments 82, 82b, 83 and 83b and peripheral wall 86 are configured to be hydrophobic or super-hydrophobic. Conductive wall segments 85 and 85b may be left bare or preferably coated with hydrophobic or super-hydrophobic materials so long as the liquid 84 may make electrical contact with wall segments 85 and 85b so sufficient charge transfer may occur. Hydrophilic coating may also be used to coat wall segments 85 and 85b so long as electrical contact can be maintained.

The invention has been described in terms of functional principles and illustrations of specific embodiments. Embodiments described herein, including descriptions of the figures, are merely intended as exemplary, but the concept of the invention is not limited to these embodiments, figures, and stated objectives of the invention or the abstract. Furthermore, various presently unforeseen or unanticipated combinations of the disclosed embodiments, or their elements, or alternatives, variations or improvements which may become apparent to those of skill in the art are also intended to be encompassed by the following claims.

What I claim is:

1. An inclinometer, comprising:
   a base for placing said inclinometer against a surface of another object;
   a vessel attached to said base comprising, a first conductive wall segment with a dielectric coated surface, a second conductive wall segment, and a conductive flowable material that partially fills said vessel, wherein said material forms a variable capacitor with said first wall segment and is in conductive electrical communication with said second wall segment;
   wherein at least a portion of said conductive flowable material forms a contact angle, with at least a portion of a wall segment of said vessel, which is greater than 100 degrees.

2. The apparatus according to claim 1, wherein said conductive flowable material comprises water.

3. The apparatus according to claim 1, wherein said contact angle is greater than 120 degrees.

4. The apparatus according to claim 1, wherein said contact angle is greater than 150 degrees.

5. The apparatus according to claim 1, wherein said contact angle is greater than 170 degrees.

6. The apparatus according to claim 1, wherein at least a portion of said wall segment of said vessel has a hydrophobic surface.

7. The apparatus according to claim 1, wherein at least a portion of said wall segment of said vessel has a super-hydrophobic surface.

8. The apparatus according to claim 3, wherein said conductive flowable material comprises water.

9. The apparatus according to claim 4, wherein said conductive flowable material comprises water.

10. The apparatus according to claim 5, wherein said conductive flowable material comprises water.

11. An inclinometer, comprising:
    a base;
    a vessel attached to said base comprising, a first conductive wall segment with a dielectric coated surface, a second conductive wall segment, and a conductive flowable material that partially fills said vessel, wherein said material forms a variable capacitor with said first wall segment and is in conductive electrical communication with said second wall segment;
    wherein at least a portion of at least one wall segment is hydrophobic.

12. The apparatus according to claim 11, wherein said conductive flowable material comprises water.

13. The apparatus according to claim 11, wherein said vessel is fixedly attached to said base.

14. The apparatus according to claim 11, further comprising a third conductive wall segment that is at least partially coated with a dielectric coating, wherein said material forms a variable capacitor with said third conductive wall segment.

15. The apparatus according to claim 11, wherein at least a portion of the surface of said second conductive wall segment is hydrophilic.

16. A method for measuring inclination, comprising:
    providing a base;
    attaching a vessel to said base wherein said vessel comprises a first conductive wall segment with a dielectric coated surface, a second conductive wall segment, and a conductive flowable material that partially fills said vessel, wherein at least a portion of at least one wall segment of said vessel has a hydrophobic surface;
    causing said flowable material to cover at least a portion of said dielectric coated surface of said first wall segment while said flowable material is in conductive electrical communication with said second wall segment, wherein the capacitance between said first wall segment and said second wall segment is proportional to said inclination;
    measuring said capacitance.

17. The method according to claim 16, wherein said vessel is fixedly attached to said base.

18. The method according to claim 15, wherein said conductive flowable material is a liquid.

19. The method according to claim 18, wherein said liquid comprises water.

* * * * *